(12) United States Patent
Olsen et al.

(10) Patent No.: US 8,702,239 B2
(45) Date of Patent: Apr. 22, 2014

(54) DIRECT ILLUMINATION FOR PROJECTION

(75) Inventors: Kjell Einar Olsen, Kråkerøy (NO);
Tobby Simonsen, Gamle Fredrikstad (NO); Sverre Lefsaker, Versterøy (NO); Jørn Eriksen, Vesterøy (NO)

(73) Assignee: Projectdesign AS, San Francisco, CA (US)

( * ) Notice: Subject to any disclaimer, the term of this patent is extended or adjusted under 35 U.S.C. 154(b) by 372 days.

(21) Appl. No.: 13/026,935

(22) Filed: Feb. 14, 2011

(65) Prior Publication Data
US 2012/0206695 A1 Aug. 16, 2012

(51) Int. Cl.
*G03B 21/14* (2006.01)

(52) U.S. Cl.
USPC .......................................................... 353/30

(58) Field of Classification Search
USPC .......... 353/30, 121, 37, 97, 99, 102; 362/341, 362/551; 385/34; 348/759
See application file for complete search history.

(56) References Cited

U.S. PATENT DOCUMENTS

| | | | |
|---|---|---|---|
| 7,163,299 B2* | 1/2007 | Lee | 353/99 |
| 2005/0007554 A1* | 1/2005 | Lee | 353/20 |
| 2010/0283921 A1* | 11/2010 | Li | 348/756 |

* cited by examiner

*Primary Examiner* — Seung C Sohn
(74) *Attorney, Agent, or Firm* — Kilpatrick Townsend & Stockton LLP

(57) ABSTRACT

Projection systems and apparatuses for providing high contrast projected images with an aspect ratio different from the aspect ratio of the imager or micro-display used are provided. Light integrators having an aspect ratio equal to the aspect ratio to the desired projected image or video can be inserted into the optical train of the projection system or apparatus to illuminate only an active area equal to having an aspect ratio equal to the aspect ratio of the desired projected image or be. By reducing the illuminated area of the imager, light scattered or otherwise diverted from pixels held in the "off state" in the non-active area of imager can be greatly reduced to provide darker dark levels in the frame surrounding the project image or video.

21 Claims, 8 Drawing Sheets

2560x1080 pixel image with regular 2560x1600 DMD and light integratig optics

Brightness with direct illumination of only active area of imager.

DIRECT ILLUMINATION FOR PROJECTION

BACKGROUND

Embodiments of the present invention are generally directed towards video projection systems. Within the field of video projection, many systems using various imager technologies exist for projecting an image onto a viewing surface. By modulating the individual pixels on imager or microdisplay device, light incident on the device can be manipulated to form high quality projected images. The form of light modulation varies based on the type of imager chip or microdisplay used in the projection system. For example, imager chips can include transmissive, reflective and polarization switching pixels.

Transmissive systems, such as those based on liquid crystal device (LCD) type light valves, selectively transmit pixels by blocking light incident on one side of the imager based on the image data sent to the imager. Similarly, reflective systems, such as those based on digital micromirror device (DMD) and reflective LCD type imagers, selectively reflect light incident on the surface of the imager to form images. Polarization switching imager chips, such as LCOS based imagers, twist or phase shift the polarization of unpolarized or polarized light incident on imager chip and reflect the light through a polarization beam splitting optic to selectively form images.

Regardless of the type of imager chip, most projection systems are limited in their ability to produce a true black or dark pixel. This limitation is based on each type of imager's inability to completely stop light from leaking through or scattering off pixels that are in the "off" state. For example, the micromirrors on a DMD are not truly planar and even when an individual micromirror is angled to reflect the majority of light beyond a rejection angle of a total internal reflection (TIR) prism, some light is scattered onto an area of the viewing surface that is intended to be dark, thus reducing the ability of such projection systems to produce black or dark areas on the viewing surface. This problem is exacerbated when the imager is operated with contiguous regions of pixels in the "off-state" because the amount of scattered light from such regions can cause black areas to appear gray or less than dark.

The effect of gray regions in a projected image is particularly apparent in projection systems that use an imager chip with an area of operable pixels configured with a particular aspect ratio to produce a projected image of a different aspect ratio. In such systems, the entire operable area, i.e. all of the pixels of the imager, are illuminated using one or more light sources. To produce an image of an aspect ratio different from the native aspect ratio of imager chip, various regions of the imager chip can be maintained in "off" state or inactive mode to produce a dark border or frame around the projected image. However, because of the limitations of the most imager chips to produce a truly dark region anywhere on the screen, the border or frame can appear to be gray and thus reduce the overall perceived contrast ratio of the projected image.

For example, and imager chip with an operable area with a 16:9 aspect ratio can be used to project a Cinemascope image with a 2.35:1 aspect ratio by holding bands of "inactive pixels" at the top and bottom of the imager chip in the "off" state, while modulating the region of "active pixels" between the bands to produce the Cinemascope image. While the resulting Cinemascope image can be satisfactory for some applications, the visibility of the top and bottom bands due to leaked or scattered light from the non-active pixels can be distracting to viewers and reduce the perceived quality of the Cinemascope images.

Various embodiments of the present invention, alone and in combination, address these problems and can be used to improve the quality of projected video and images having an aspect ratio different from the aspect ratio of the imager chips used in projection system.

BRIEF SUMMARY

Embodiments of the present invention are directed toward projection systems, devices, methods, and assemblies for improving the quality of projected images with an aspect ratio different from the aspect ratio of the imager device or microdisplay used to produce the projected image. In such systems, the imager device can be operated with active and non-active areas. The active areas can include the pixels operated to produce a desired image, while the non-active pixels are operated in an "off" state to define a dark frame or boarder around the projected image. By matching the aspect ratio of the light integrator to the aspect ratio of the active area, which can be smaller than the total operable area of the imager device or micro-display, embodiments of the present invention can be configured to illuminate only the active area. By illuminating only the active area, embodiments of the present invention can reduce or eliminate the light that would otherwise be scattered or leaked from pixels in the non-active areas and projected onto the dark frame or boarders of the projected image. By reducing or eliminating the light projected onto the dark frame or boarders, the contrast ratio between the desired projected image and the dark frame or boarders can be improved, thus increasing the overall perceived quality of the projected image.

Some embodiments include optical and projection systems and projector devices having a light integrator having a first length, a first width and a first depth, wherein the first width and the first depth define a first cross-sectional area with a first aspect ratio and the first length is parallel to an optical axis of the projection system, a prism aligned with the optical axis having an input surface, an imager interface surface, and an output surface, and an imager aligned with the imager surface of the prism and operated in a first mode with an first active area having a second aspect ratio and operable to reflect light incident on the imager selectively through the output surface of the prism. The first aspect ratio of the light integrator can be substantially equal to the second aspect ratio of the active area of the image.

The optical systems can also include a light source aligned with the optical axis and disposed to input light into an input end of the first light integrator and wherein the first light integrator is disposed in alignment with the optical axis and the light source to illuminate the first active area of the imager from an output end of the first light integrator. In various embodiments, the optical system can further include relay optics aligned with the optical axis and disposed between the first light integrator and the prism to correct a difference between the first cross-sectional area of the light integrator and the second active area of the imager. When the optical system is operated in second mode with a second active area having a third aspect ratio and further including a second light integrator having a second length, a second width, and a second depth, wherein the second width and the second depth define a second cross-sectional area and a fourth aspect ratio. In such embodiments, a light integrator exchange mechanism to move the first light integrator out of alignment with the optical axis and to move the second light integrator into alignment with the optical axis between the light source and the prism to illuminate the second active area of the imager can also be included in the optical system.

Other embodiments of the present invention are directed toward projector systems that include various components such as a light source and a optical assembly. In such embodiments, the optical assembly can include a light integrator having an input aligned with the light source and having an output with first aspect ratio, a relay lens disposed in alignment with the output of the light integrator, a prism having a plurality of surfaces disposed in alignment with the relay lens. The projector systems can also include an imager having an operable area in alignment with the optical assembly and a projection lens disposed in alignment with the optical assembly and the imager. The optical assembly can be configured to provide light to an active area of the operable area, the active area being smaller than the operable area.

In other embodiments, the light integrator in the projector system can be an integrating sphere, a light pipe homogenizing rod. The input of the light integrator can be a first end of the rod and the output can be a second end of the rod and opposite the first end. The aspect ratio of the first end of the rod can have an aspect ratio different from the aspect ratio of the second end. In such embodiments, the rod can taper from the first end to the second end.

In some embodiments, the projector system can include a light pipe homogenizing rod that is a solid rod of optical material. In other embodiments of the projector system can include a light pipe homogenizing rod that is a hollow rectangular tube. In yet other embodiment, the output of the light integrator includes an aperture. The aperture can be fixed or adjustable or the aperture can include a number of interchangeable apertures having a variety of aspect ratios.

Other embodiments of the present invention are directed toward a method using or operating a projector system that includes providing an projector system having a first interchangeable light integrator having an output with a first aspect ratio, a second interchangeable light integrator having an output with a second aspect ratio, and an imager with an operable area aligned with the first or second interchangeable light integrator. The method further includes operating the operable area of the imager with an active area having a third aspect ratio and a non-active area, aligning the first interchangeable light integrator with the active area when the third aspect ratio is equal to the first aspect ratio, and aligning the second interchangeable light integrator with the active area when the third aspect ratio is equal to the second aspect ratio.

DETAILED DESCRIPTION

Figure 1A:
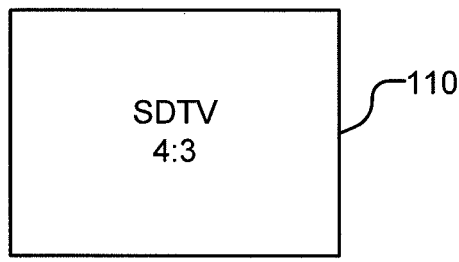
FIGS. 1A-D show examples of aspect ratios of projected images and imager chips.
Figure 1B:
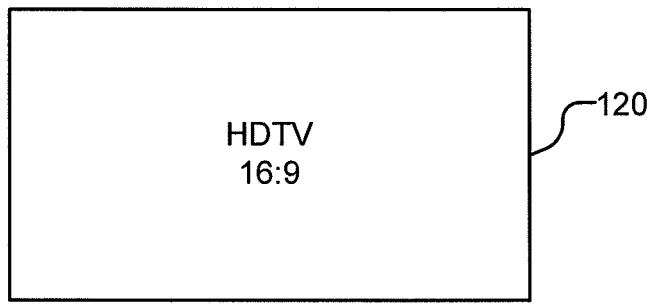
Figure 1C:
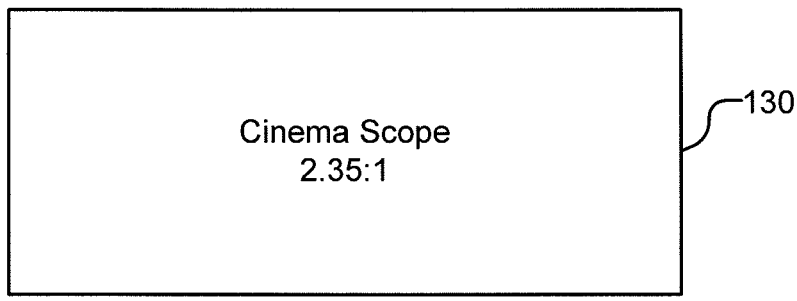
Figure 1D:
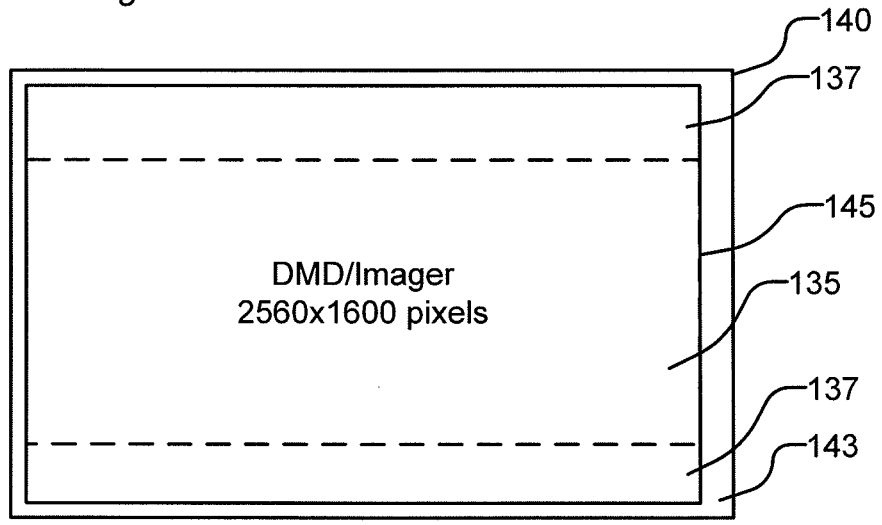

Embodiments of the present invention are directed towards projection optics, projection systems, and image and video projectors. Specifically, embodiments of the present invention are directed at improving the contrast ratio between the dark bands that frame or border a projected image or video that result from using and imager device with an active area that has an aspect ratio different from the aspect ratio of a desired projected image or video. To reduce or eliminate light scattered or leaked from non-active areas of an imager device, embodiments of the present invention are directed toward illuminating only the active area of the imager device that has the same aspect ratio as the desired projected image or video. According to various environments of the present invention, limiting which area of an imager device, such as a DMD, LCD or LCOS imager chips, can be achieved by shaping the aspect ratio of uniform illumination by using a light integrator with an output having the same aspect ratio as the desired projected image.

According to some embodiments, projection systems or video projectors can include two or more light integrators with different aspect ratios that can be changed based on the aspect ratio of the desired projected image. For example, a single video projector unit that uses a full HDTV capable 16:9 imager chip or micro-display can include one light integrator having aspect ratio of 4:3 and another light integrator having an aspect ratio of 2.35:1 to produce both 4:3 and 2.35:1 aspect ratio projected images with improved contrast ratio between the active and non-active areas. When a 4:3 projected image is desired, the 4:3 aspect ratio light integrator can be inserted into the optical train to illuminate only a 4:3 active area of the imager. Similarly, when a Cinemascope (2.35:1) aspect ratio projected image is desired, the 2.35:1 aspect ratio light integrator can be inserted into the optical train to illuminate only a 2.35:1 active area of the imager. While it is possible to use the light integrator having an output with the same aspect ratio and physical dimensions of the active area of the imager used to produce a projected image of the same aspect ratio, is often desirable to use a light integrator with an output that has a larger or smaller dimensions of the active area. To correct for the discrepancy in sizes between the output of the light integrator and the active area of the imager, various relay, magnification or reduction lenses can be used.

Various aspects of the present invention are described herein with reference to exemplary embodiments of digital projection optics, projection systems, and projectors, but these exemplary embodiments should be considered illustrative only and should not be considered to be limiting in any way.

Aspect Ratios

FIG. 1 shows various representations of standard aspect ratios. In general, the term aspect ratio refers to the ratio between one dimension and another dimension of a rectangular two-dimensional area. If each dimension is measured in a common unit of measurement, then the ratio is unitless. For example, the dimensions can be measured in inches, meters, centimeters, pixels, etc. It is customary in the image and video display industry for the aspect ratio to be shown as a reduced ratio of the length of an image to the height of an image. Exemplary standard video formats have defined aspect ratios. Standard definition television (SDTV) has aspect ratio of 4:3 and is shown as element 110. High-definition television (HDTV) has an aspect ratio of 16:9 as shown in elements 120. Cinemascope, a common format in the movie industry, has an aspect ratio of 2.35:1, as shown in element 130. While some embodiments of the present invention are directed toward standard aspect ratios, other embodiments are directed to systems and projectors for projecting image and video with non-standard aspect ratios.

As mentioned above, some video projection systems use imager chips with operable areas with aspect ratios different from the aspect ratio of the desired projected image. For example, DMD/imager 140 can be operated with an operable area 145 and a non-operable area 143. Operable area 145 can include a number of picture elements, or pixels, arranged in an organized array that can be controlled by control circuitry included on DMD/imager 140 or by a separate stand-alone control circuit or system (not shown) to selectively transmit, reflect or otherwise modulate light to produce a projectable image. Operable area 145 can be configured to produce an HDTV image. In such cases the operable area 145 can have an aspect ratio of 16:9. In such embodiments, the operable area 145 can have a width of 2560 pixels by 1600 pixels.

To produce a projected image that has an aspect ratio different from the native 16:9 aspect ratio of DMD/imager 140, the pixels in the operable area of the imager can be separated into one or more active areas and one or more non-active areas. In FIG. 1, DMD/imager 140 is shown with an overlay of an area 135 with an aspect ratio of 2.35:1 on operable area 145. This effectively separates operable area 145 into an active area 135 and non-active area 137. The pixels in non-active area 137 can be set to an off state, in which they do not reflect or transmit incident light into the projection optics of the projection system or video projector. However, in traditional systems, non-active areas 137 are still eliminated by whatever light source is being used to drive the projector system. As such, some amount of light is leaked or scattered into the regions of the projected image corresponding to the non-active areas 137. This results in a portion of the projected image on the viewing surface to appear less than absolutely black and thus reduces the overall quality of the projected image. To reduce or eliminate the leaked or scattered light from being projected onto the viewing surface corresponding to the non-active areas 137, various embodiments of the present invention can be implemented in various projection systems and projectors described herein.

Figure 2:
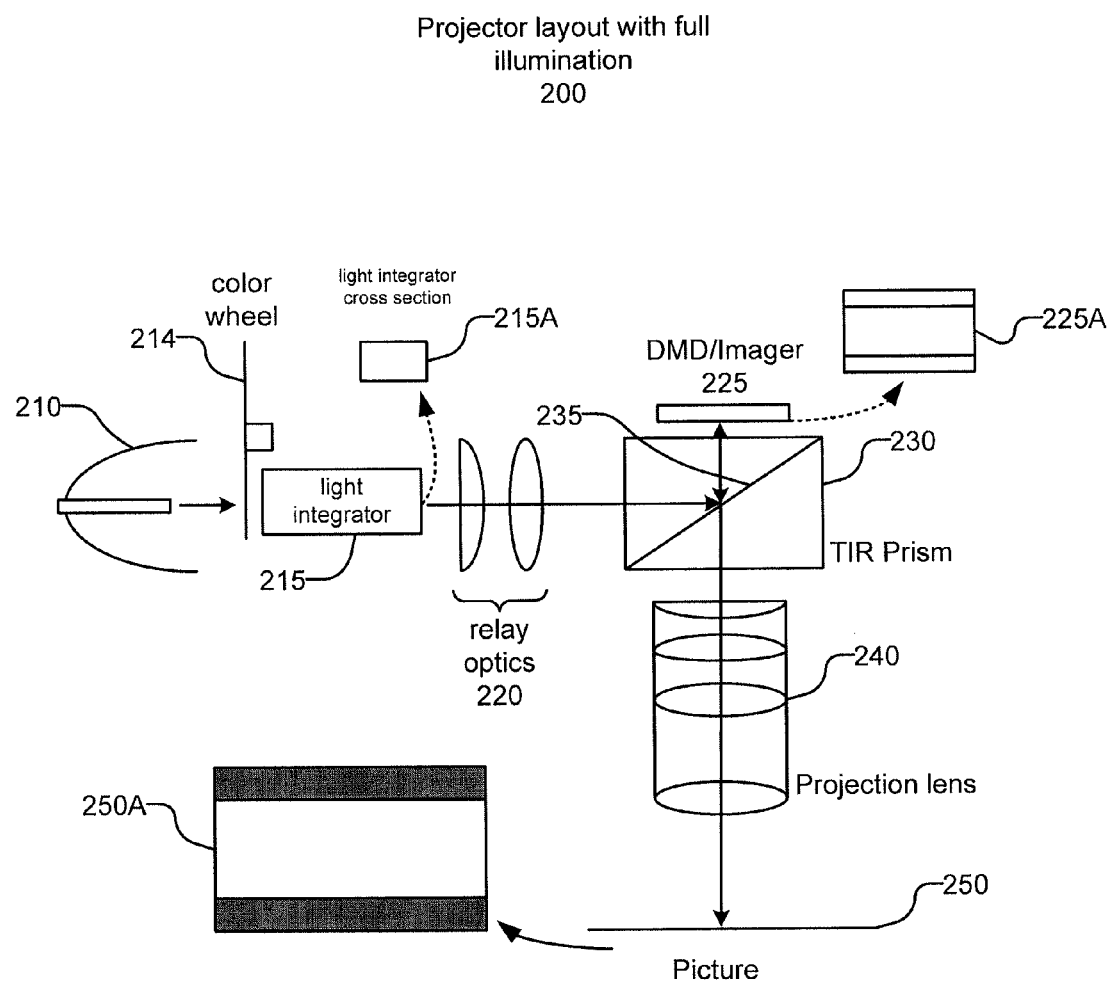
FIG. 2 shows a schematic of a projection system that can be improved by various aspects of the present invention.
Figure 4:
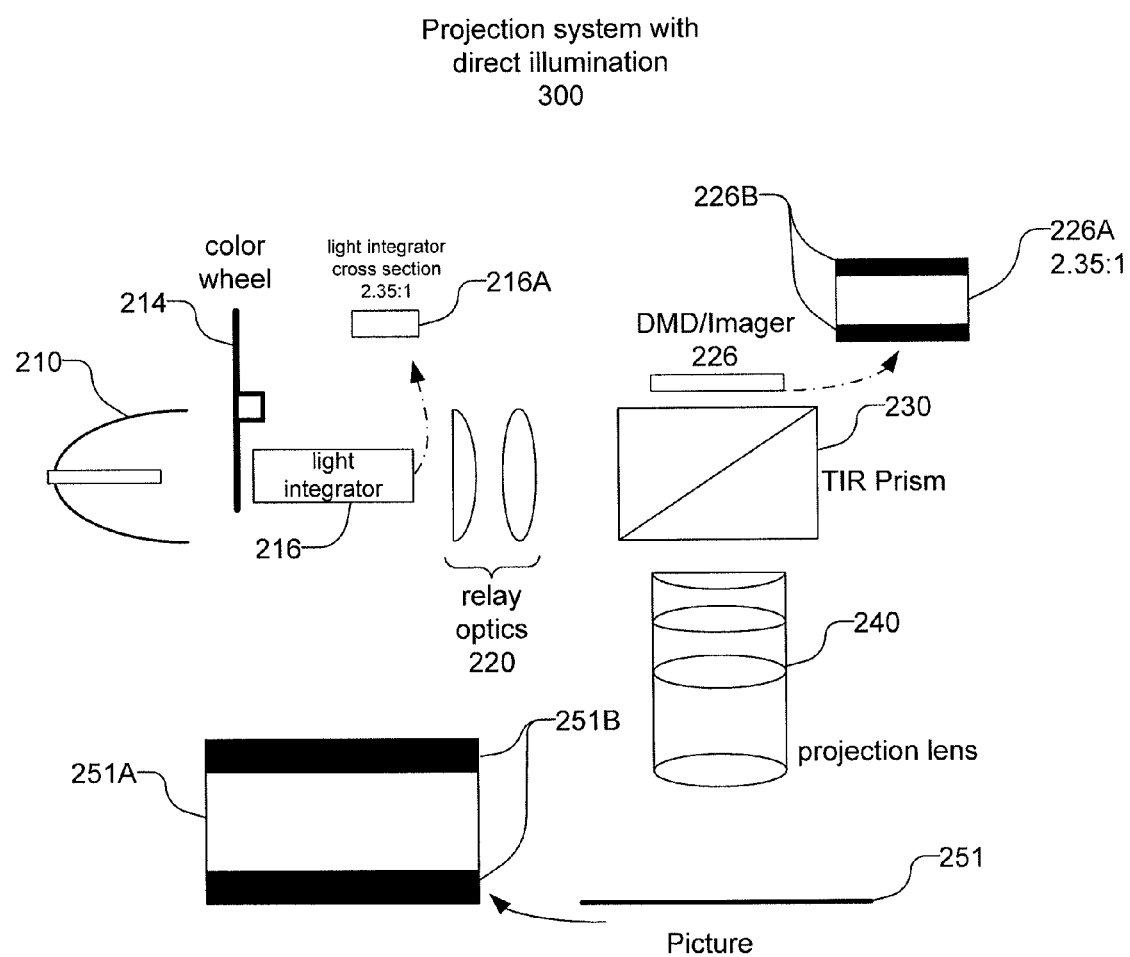
FIG. 4 shows a block diagram of a projection system according to embodiments of the present invention.
Figure 6:
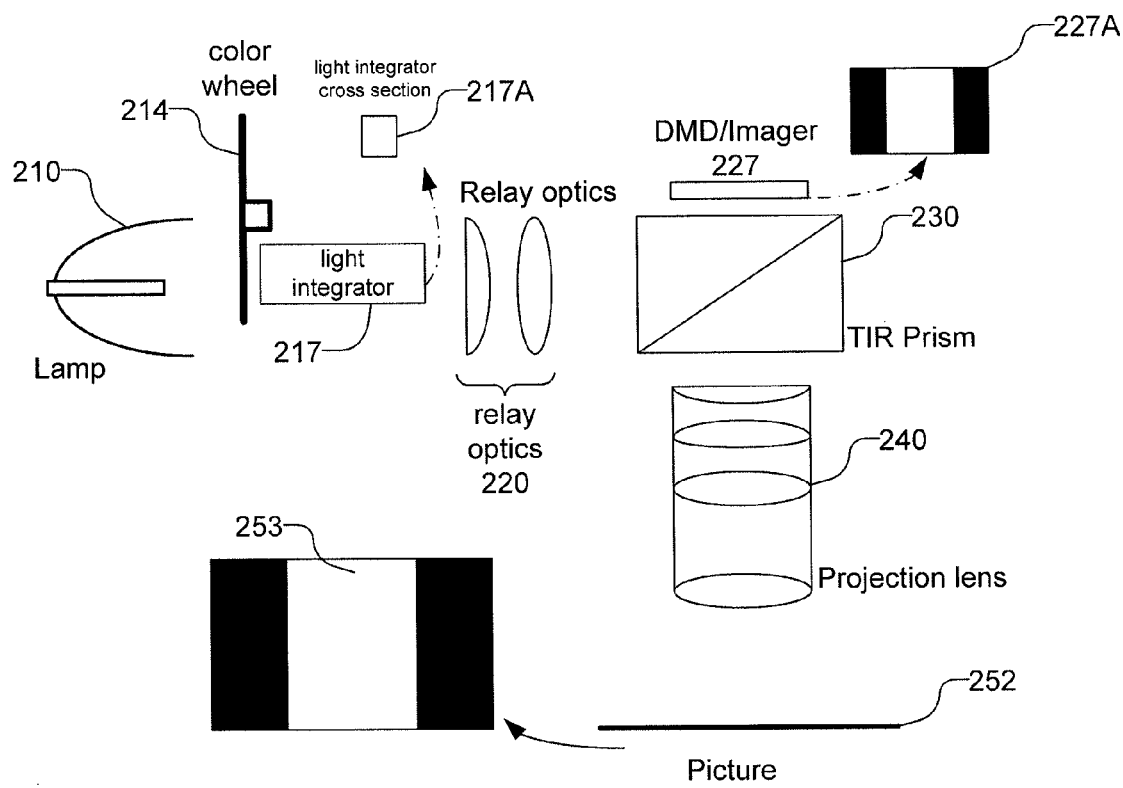
FIG. 6 shows a block diagram of a projection system according to embodiments of the present invention.

FIG. 2 is a schematic of a projector system layout with full illumination 200 that can be improved by various embodiments of the present invention. Common elements of FIGS. 2, 4, and 6 are labeled with the same numbers for the sake of clarity. Projector system layout 200 can include a number of optical, mechanical, electronic elements to produce a projected video or image. The system 200 can include light source 210, such as an incandescent, halogen, tungsten, halide or other lamp, as well as LEDs, lasers and other sources. Light source 210 can be aligned or configured to illuminate or input light through a color wheel 214.

Color wheel 214 can include a number of absorptive or interference type band pass filters that can be rotated in coordination with the control of DMD/imager 225 to deliver the correct wavelength of light for a particular frame or subframe. While the specific number of spectral bands and corresponding color band pass filters can vary from system to system, most contemporary color wheel configurations utilize some combination of red, green, and blue band pass filters. In similar systems, which are not shown, that use more than one DMD/imager 225, the color wheel can be omitted and each DMD/imager 225 can be individually illuminated with a specific spectral band, then the processed light can be recombined using various forms of color combining prisms. While such embodiments are not specifically shown in FIG. 2, it will be evident to one of ordinary skill in the art that embodiments of the present invention can be used to improve projection systems that use one or more DMD/imagers 125.

With or without color wheel 214, light from light source 210 can be focused on and or input into a light integrator 215. Light integrator 215 can be implemented in a number of ways. For example, light integrator 215 can include a rectangular light pipe homogenizing rod. Such light pipe homogenizing rods utilize multiple total internal reflections to homogenize non-uniform light sources regardless of their spectral characteristics. In some embodiments, the light pipe homogenizing rod can be tapered from one end to the other. Such tapered light pipe homogenizing rods can be obtained in a number of magnifications. The numerical aperture (NA) of the light output is reduced proportionally to the magnification, allowing significant reduction in NA of the output light.

In other embodiments, other cross-section profiles of light pipe homogenizing rods are available. For example, light pipe homogenizing rods can have circular cross-sections and hexagonal cross-sections, which may or may not be desirable for particular applications of image and video projection. Accordingly, for most traditional video projection applications, a rectangular cross section light pipe homogenizing rod, with or without a taper, is desirable. Tapered and non-tapered light pipe homogenizing rods can have an input end and an output end. In tapered light pipe homogenizing rods, the aspect ratio can be the same or different. For example, the input end can have a 4:3 aspect ratio, while the output end can have a 16:9 aspect ratio. Alternatively, the aspect ratio of the input end and the out end can have the same aspect ratio but with different dimensions to reduce or increase the size or numerical aperture of uniform illumination.

In traditional projection systems, the aspect ratio of the cross-section of output end of the light pipe homogenizing rod is usually chosen to match the aspect ratio of the operable area of the DMD/imager 225 used to produce the projected image or video. The cross-section of the light pipe homogenizing rod can be defined by the width and the depth of the light pipe homogenizing rod. The length of the light pipe homogenizing rod can be arbitrary, however, various lengths may be more or less effective in homogenizing the illumination. One of ordinary skill in the art will recognize that the length of the light pipe homogenizing rod will have an impact on the performance of the light pipe homogenizing rod and the rest of the system into which it is implemented.

In other systems, light integrator 215 can include an light integrating sphere (not shown). The diameter and interior coating can determine the level of uniformity that the light integrating sphere can provide. The integrating sphere can include an input port into which light source 210 can input light and an output port out of which uniform illumination can be observed and/or transmitted. The output port can include an aperture with a rectangular aspect ratio to match the DMD/imager 225 used to produce the projected video or image.

However, when the aspect ratio of the light output from the light integrator is different from the aspect ratio of the desired projected image or video, the problems described above associated with illuminating active and non-active regions of the DMD/imager 225 arise.

As shown in FIG. 2, the cross section 215A of light integrator 215 in system 200 does not match the desired aspect ratio 225A of the active area of DMD/imager 225 for the desired projected image 250A. In this particular example, the aspect ratio of the cross-section of light integrator 215A matches the aspect ratio of DMD/imager 225. While this might be ideal for projecting an image with an aspect ratio equal to the aspect ratio of the operable area of DMD/imager 225, it is less than ideal in producing a projected image with an aspect ratio different from the aspect ratio of DMD image or 225.

Specifically, light output from the output of light integrator 225 will have an aperture aspect ratio with a profile equal to the light integrator cross section 215A. Output light with an aperture profile with the same aspect ratio of light integrator cross section 215A is relayed via relay optics 220 to total internal reflection (TIR) prism 230. Relay optics 220 can include various combinations of spherical and aspheric optical lenses and elements to adjust, correct, magnify, and otherwise relay the uniform light output from light integrator 215 into and through an input surface of TIR prism 230. The angle at which light from relay optics 220 is input into the input surface of the TIR prism 230 is controlled so that the light is reflected off of surface 235 onto DMD/imager 225 to illuminate the operable area of DMD/imager 225.

In this example, the desired projected picture 250A has an aspect ratio of 2.35:1. Accordingly, DMD/imager 225 will be operated with an active area and a non-active area. The active area will include pixels that are modulated to produce the desired projected image or video while the non-active area will be held in an off state to produce a dark frame or top and bottom bands to project a 2.35:1 Cinemascope video image.

The resulting top and bottom bands framing image 250A can only be as dark as the ability of DMD/imager 225 to eliminate or deter light from entering projection lens 240 and reaching those bands on the viewing surface. Due to the leaked or scattered light from DMD/imager 225, the bands on picture 250 will not be totally dark. In traditional systems in the overall resulting contrast ratio, including the dark bands, is approximate 2000:1. While 2000:1 is a decent contrast ratio, the actual Cinemascope video image will appear to be framed by dark gray bands. Embodiments of the present invention are directed towards improving the contrast ratio of the bands surrounding a projected video or image having an aspect ratio different than the aspect ratio of the operable area of the DMD/imager 225 used to generate the video or image.

In other embodiments, the light integrator 215, relay optics 220 and TIR prism 240, and any other component of the projection system or projector can be included in an optical assembly within the projection system or projector. In embodiments that provide interchangeable light pipe homogenizing rods, the entire optical assembly of properly matched and aligned components can be changed as a whole optical assembly. For example, one optical assembly including a light integrator can be removed and another optical assembly that includes another light integrator can be placed or inserted. Such optical assemblies can also include the light source 210 or projection lenses 240 or DMD/imager 225.

Figure 3:
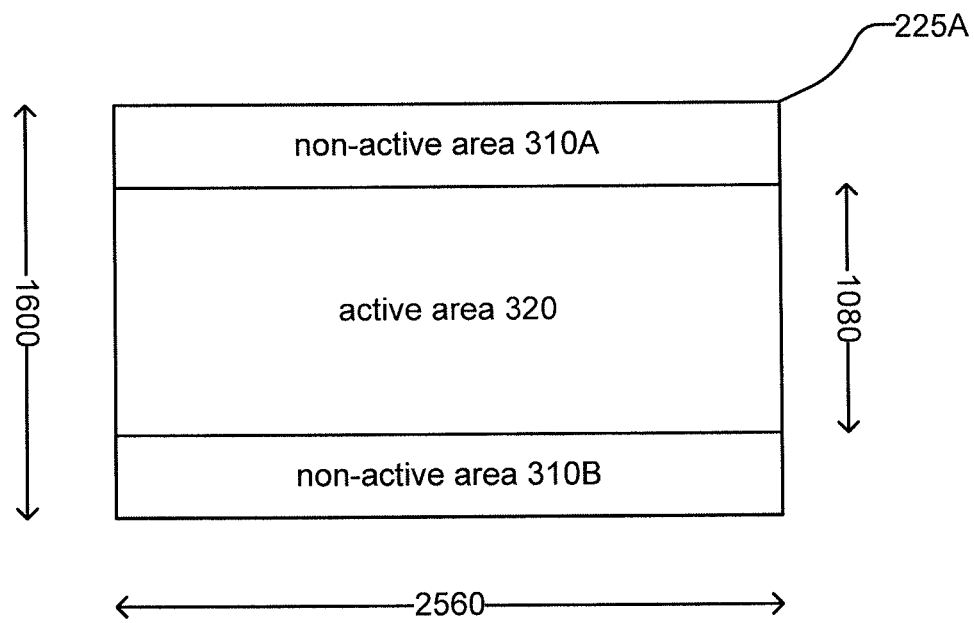
FIG. 3 shows a block diagram of the active and non-active areas of imager chip with an aspect ratio used to project an image with a different aspect ratio.

FIG. 3 shows an example of the active and non-active areas of the operable area 225A of DMD/imager 225 according to traditional systems and methods for producing a projected images having an aspect ratio different from the aspect ratio of the operable area of the DMD/imager 225. As noted, DMD/imager 225 has an operable area 225A with 2560×1600 pixels which is suitable for producing full HDTV (i.e. 1080 p in the 16:9 aspect ratio) or any other aspect ratio within the 2560× 1600 pixels of the operable area 225A. The example in FIG. 3 shows 1080 pixel high and 2560 pixel wide active area 320 and two smaller non-active areas 310A and 310B. The active area 320 can be operated in coordination with a light source and/or a color wheel to manipulate incident light to produce a desired projected image. Meanwhile, the non-active areas 310A and 310B can be operated or otherwise maintained in an "off" state to produce two dark fields that frame the image. Ideally, these non-active areas would result in no light that is incident on the imager being projected onto a viewing surface at which the projection system is directed. However, due to the limited ability of most imagers to reject, absorb or redirect all light, some of the incident light is ultimately leaked or scattered into the projection lens and thus projected onto the viewing surface. When this happens, the dark regions framing the projected image can appear gray, or in worse cases, some hue or color tone that can be distracting or otherwise diminish the appearance of the projected image.

FIG. 4 shows projection system 300 according to one exemplary embodiment of the present of the present invention. Projection system 300 can include many of the same elements that perform generally the same function as described in reference to FIG. 2. However, the light integrator 216 can have a cross section or output aspect ratio 216A that is different from the aspect ratio of operable area of the DMD/imager 226. In this example, the DMD/imager 226 is operated with an active area 226A with a 2.35:1 aspect ratio.

As discussed above, the light integrator in contemporary image and video projectors typically match the output aspect ratio or cross section 215A of the light integrator 215 to the aspect ratio of the operable area of 225A of the DMD/imager 225. This usually provides projectors with a degree of flexibility in the types of images and videos that can be projected, but also causes the undesirable distracting frames at the top and bottom of the projected image or video caused by light leakage from the non-active areas.

In the projection system 300, light integrator 216 is selected, adjusted, configure or otherwise made to have a cross section or exit aperture with an aspect ratio of 2.35:1 that matches the aspect ratio of the desired projected image or video. In the example shown in FIG. 3, the desired projected image has a 2.35:1 aspect ratio, which is still different from the aspect ratio of the operable area of DMD/imager 226.

The DMD/imager can be any of a number of imager chips from various manufacturers. For example, DMD/imager 226 can be a Texas Instruments DLP chip similar to the imager shown in FIG. 3 that has a 2560 pixels by 1600 pixels operable area. Depending on aspect ratio of the desired projected image, various active areas 226A of the DMD/imager 226 can be active, while the non-active areas 226B are maintained in an "off" state. As shown in FIG. 4, the DMD/imager 226 can be operate with an active area 226A that has an aspect ratio of 2.35:1 to match the 2.35:1 aspect ratio of the desired projected image. The active area 226A can of course be positioned anywhere within the boundary of the operable area of DMD/ imager 226 as long as it is aligned with the illumination pattern relayed onto the surface by the relay optics 220 from the light integrator 216. This flexibility in the alignment of the DMD/imager provides various industrial and economic advantages.

In some embodiments, DMD/imagers with bad, hot or dead pixels in the intentionally non-active areas can be used. Using such sub standard or defective DMD/imagers provides an opportunity to provide high quality projection systems and projectors in a cost effective manner. Since the bad, dead or hot pixels will not be used for producing the image if located in the non-active areas 226B, there is no detrimental effect on the projected image. Accordingly, manufacturing yields of DMD/imagers intended for use in various embodiments of the present can experience significant improvement. As long as some contiguous area of pixels within the operable area of the DMD/imager large enough to include an active area of the correct resolution and aspect ratio is free from defects that would otherwise render the DMD/imager unsuitable for use in other projection systems, embodiments of the present invention can use a variety of existing imperfect or otherwise flawed DMD/imagers.

Once DMD/imager 226 is properly aligned and operated with an active area 226A, an image having an aspect ratio of 2.35:1 can be projected through projection lens 240 onto viewing surface 251 to produce a picture or video with an image 251A that has an aspect ratio that is equal to aspect ratio 226A. One of the advantages of only illuminating the active area of the DMD/imager is to provide higher contrast ratios by avoiding projecting light scattered off of the non-active areas 226B onto the viewing surface 251 and into what should be the margins or dark areas 251B. The resulting dark areas 251B can achieve nearly perfect darkness with only minor bleed over from light scattered or otherwise unintentionally redirected from the edges of active area 226A of the DMD/imager 226.

Figure 5:
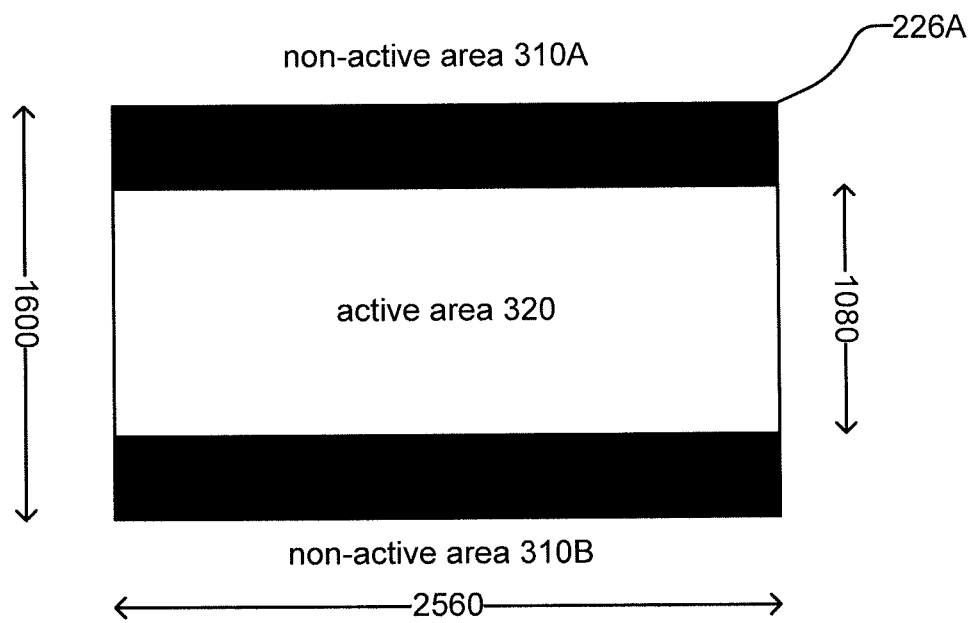
FIG. 5 shows a block diagram of the active and not active areas of an image or chip and aspect ratio used to project an image of a different aspect ratio has improved by embodiments of the present invention.

FIG. 5 shows an example of the illumination reflected off or transmitted through active area 320 and non-active areas 310A and 310B of the operable area 226A of DMD/imager 226 according to the exemplary embodiment shown in FIG. 4 for producing a projected image having an aspect ratio different from the aspect ratio of the operable area of the DMD/imager 226A. As shown, the illumination reflected off of or transmitted through the non-active areas 310A and 310B is less than the non-active areas shown in FIG. 3 in a traditional projection system. Since there is no light illuminating the non-active areas, there is less light reflected or transmitted from the non-active areas, thus producing a much darker frame around the projected image produced by active area 320. While the operable areas 225A and 226A may be on the same DMD/imager, the level of illumination incident on non-active areas of DMD/imager is less, therefore, the projected image of the frame around the active area is darker.

FIG. 6 shows a projection system 400 according to yet another embodiment of the present invention. As shown, projection system 400 includes many of the same components of projection systems 200 and 300 that perform similar functions. The main difference between the projection system 400 and previously discussed systems, include light integrator 217 having a cross section 217A and DMD/imager 227 which can be operated to have a vertically oriented active area within the operable area 227A. FIG. 6 shows that the desired image or video projected onto the viewing surface 252 as a vertically oriented aspect radius ratio 253, i.e. the height of the image is longer than the width of the image. To project such an image, the cross-section or aspect ratio of the output of light integrator 217 can be oriented in aligned with the DMD imager 227 to only illuminate the vertically oriented active area of the operable area 227A of DMD/imager 227.

It is also possible to use light integrators that have non-rectangular cross sections. For example, light integrator 217 can have a round cross-section, hexagonal cross-section, octagonal cross-section or any other uniform or tapered cross-section capable of being manufactured into a light pipe homogenizing rod. In such embodiments, the active area of the operable area 227A can be operated to provide a correspondingly shaped image surrounded by a corresponding non-active area to provide an appropriately shaped frame around the projected image.

Figure 7:
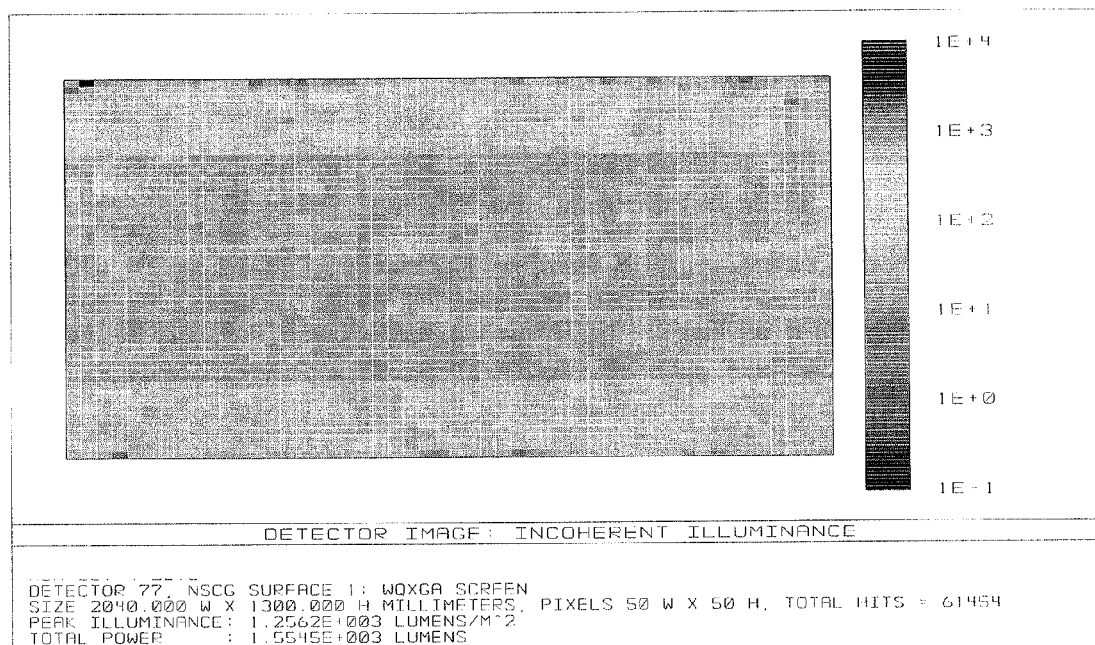
FIG. 7 shows the illuminance distribution of a fully illuminated DMD operated with non-active top and bottom bands to produce an image using middle active region.

FIG. 7 shows the incoherent illuminance on a 2560×1080 pixel region of a regular 2560×1600 DMD with light integrating optics in traditional projection systems. This graph represents the illuminance reflected off the top and bottom non-active areas and the central active area of a DMD/imager when the entire operable area is illuminated without an appropriately shaped corresponding light integrator. While the central band having an aspect ratio of 2.35:1 is clearly reflecting or transmitting more light, it is clear that the non-active areas are also reflecting significant amounts of light. In such systems, the contrast ratio between the non-active and active areas can achieve contrast ratios of approximately 2000:1. One goal of the present invention is to increase the contrast ratio between the projected active and non-active areas of imager.

Figure 8:
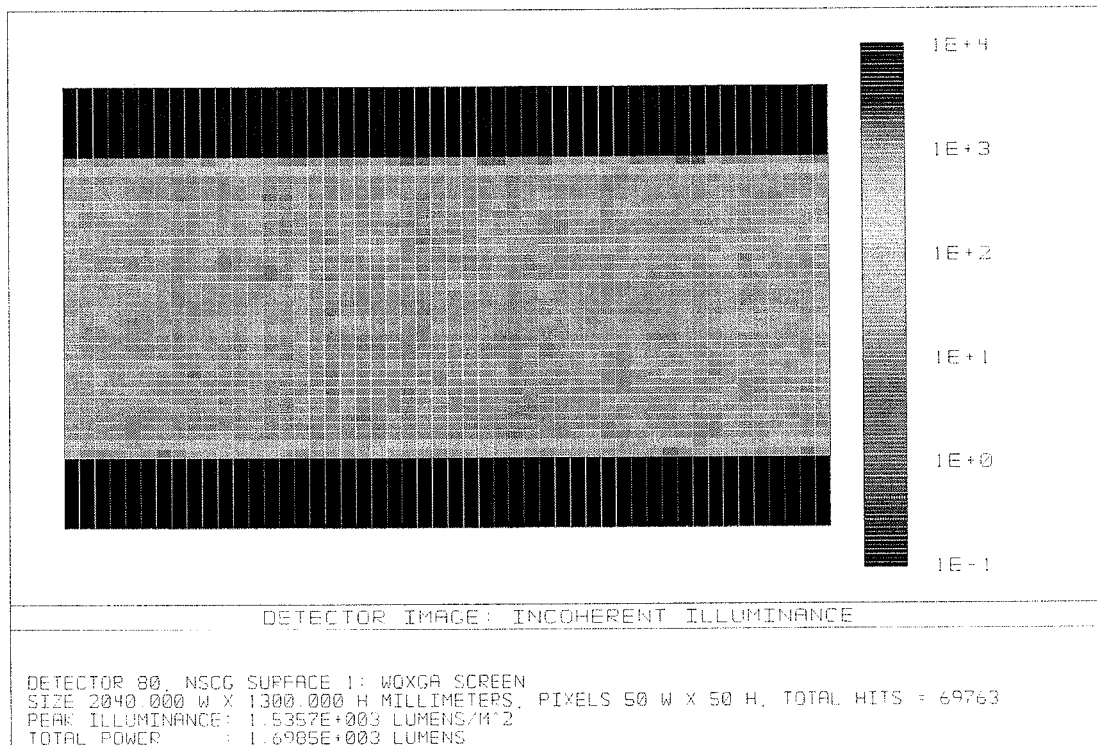
FIG. 8 shows the luminance distribution of the active area of a partially illuminated DMD using embodiments of the present invention.

FIG. 8 shows the incoherent illuminance of a 2560×1080 pixel image with regular 2560×1600 DMD and light integrating optics in projection systems according to various embodiments of the present invention. As shown, the non-active areas above and below the central active area reflect far less light than the non-active areas shown in FIG. 7. This is largely due to the fact that the corresponding light integrator used to illuminate the imager used to create the detector image in FIG. 8, can be selected to only illuminate the central portion, i.e. the active area, of the operable area of the DMD/imager. The resulting reflected light from the non-active areas at the top and bottom of the operable area is significantly reduced. In such embodiments, that contrast ratio between the projected image of the non-active area and the active area of the DMD/imager can approach an infinite contrast ratio. In addition to the superior black levels outside of the projected image of the active area of the DMD/imager, i.e. 2.35:1 image, embodiments of the present invention can also provide increased brightness in the range of 15% for the projected image of the active area.

Aspect Ratio of the Light Integrator

The aspect ratio of the light integrator used in various embodiments of the present invention can depend on a number of factors and variables of the projection system into which it is integrated. In embodiments that use solid light pipe homogenizing rods, the cross-section can be equal to the resulting aspect ratio. The cross-section of such light integrators can depend on the aspect ratio of the DMD/imager and the f-number of the light source or illumination system. For example, the pixel pitch for a 2560×1600 pixels DMD is 7.56μ which gives a DMD size of 19.353 mm×12.096 mm. Using such a DMD and a light source with the f-number of 2.6, the cross-section of the light integrator should be 7.85 mm×5.1 mm which includes some overfill of the margins surrounding the 2560×1600 pixels operable area. However, embodiments that only use 2560×1080 pixels of the operable area as the active area of the DMD, the cross-section of the light integrator can be reduced to 7.85 mm×3.45 mm to include some overfill in the margins surrounding the active area.

In other embodiments, the light integrator can be a light integrating sphere. To control the aspect ratio of the light integrating sphere, the output port of the integrating sphere can be restricted with an aperture with an aspect ratio corresponding to the aspect ratio of the desired projected image or video. In such embodiments, the output aperture on the integrating sphere can be a fixed aperture, while in other embodiments the output aperture can be an adjustable aperture so the output light can be automatically or manually adjusted to an aspect ratio corresponding to the desired projected image. To match the appropriate f-number and fill factor for the corresponding active area of the imager, various corrective optics can be used.

DEFINITIONS

The following terms used herein are defined as follows.

Imagers: Devices capable of manipulating incident light to produce images. Imagers can comprise silicon based devices that operate in reflective or transmissive modes. Such imagers can include micro-display or micro-projection devices such as liquid crystal device (LCD) devices, liquid crystal on silicon (LCOS), or digital micromirror devices (DMD).

Operable area of an imager: Most imager devices include a two-dimensional array of picture elements, or "pixels," that are operable to manipulate light to produce images. In some embodiments, the operable area includes an area smaller than the total surface area of the imager. In other embodiments, the operable area includes the entire surface area of the imager.

Active area of an imager: In operation, the operable area of an imager can include an active area. The active area is the region of the operable area with a given aspect ratio to produce an image. The pixels in the active area are selectively operated to reflect or transmit light. In some embodiments, the active area is smaller than the operable area of the imager. The active area can have an aspect ratio equal to or different from the aspect ratio of the operable area.

Non-Active area of an imager: In operation, any region of the operable area not in the active area is a non-active area. When the imager is in operation, the non-active area can be held in a state, such as an "off-state" or a "dark state," in which light incident on the imager is blocked, redirected or altered/unaltered so as to not be projected onto a view surface. The non-active area typically has a smaller area than the operable and active areas. Similarly, the non-active area can have an aspect ratio equal to or different from the aspect ratio of the active or operable areas.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. An optical system comprising:
    a first light integrator having a first length, a first width and a first depth, wherein the first width and the first depth define a first cross-sectional area with a first aspect ratio and the first length is parallel to an optical axis of the projection system;
    a prism aligned with the optical axis comprising:
        an input surface;
        an imager interface surface; and
        an output surface; and
    an imager aligned with the imager surface of the prism and operated in a first mode with a first active area having a second aspect ratio and operable to reflect light incident on the imager selectively through the output surface of the prism, wherein the imager has an operable area that is larger than the first active area;
    wherein the first aspect ratio of the light integrator is substantially equal to the second aspect ratio of the active area of the imager.

2. The optical system of claim 1 further comprising a light source aligned with the optical axis and disposed to input light into an input end of the first light integrator and wherein the first light integrator is disposed in alignment with the optical axis and the light source to illuminate the first active area of the imager from an output end of the first light integrator.

3. The optical system of claim 2 further comprising relay optics aligned with the optical axis and disposed between the first light integrator and the prism to correct a difference between the first cross-sectional area of the light integrator and the second active area of the imager.

4. The optical system of claim 2 wherein the imager is operated in second mode with a second active area having a third aspect ratio and further comprising a second light integrator having a second length, a second width, and a second depth, wherein the second width and the second depth define a second cross-sectional area and a fourth aspect ratio; and
    a light integrator exchange mechanism to move the first light integrator out of alignment with the optical axis and to move the second light integrator into alignment with the optical axis between the light source and the prism to illuminate the second active area of the imager.

5. The optical system of claim 2 further comprising a projection lens to project light reflected off of the first active area of the imager through the output surface of the prism onto a viewing surface.

6. A projector system comprising:
    a light source;
    an optical assembly comprising:
        a light integrator having an input aligned with the light source and having an output with a first aspect ratio;
        a relay lens disposed in alignment with the output of the light integrator; and
        a prism having a plurality of surfaces disposed in alignment with the relay lens;
    an imager having an operable area in alignment with the optical assembly; and
    a projection lens disposed in alignment with the optical assembly and the imager,
    wherein the optical assembly is configured to provide light to an active area of the operable area, the active area being smaller than the operable area.

7. The projector system of claim 6 wherein the light integrator is an integrating sphere.

8. The projector system of claim 6 wherein the light integrator is a light pipe homogenizing rod.

9. The projector system of claim 8 wherein the input comprises a first end of the rod and the output comprises a second end of the rod and opposite the first end.

10. The projector system of claim 9 wherein the first end of the rod has third aspect ratio different from the first aspect ratio of the second end, wherein the rod tapers from the first end to the second end.

11. The projector system of claim 9 wherein the light pipe homogenizing rod comprises a solid rod of optical material.

12. The projector system of claim 9 wherein the light pipe homogenizing rod comprises a hollow rectangular tube.

13. The projector system of claim 9 wherein the output further comprises an aperture.

14. The projector system of claim 13 wherein the aperture comprises a plurality of interchangeable apertures having a plurality of aspect ratios.

15. A method comprising:
    providing a projector system comprising:
        a first interchangeable light integrator having an output with a first aspect ratio;
        a second interchangeable light integrator having an output with a second aspect ratio that is different than the first aspect ratio; and
        an imager with an operable area aligned with the first or second interchangeable light integrator;
    operating the operable area of the imager with an active area having a third aspect ratio and a non-active area;

aligning the first interchangeable light integrator with the active area when the third aspect ratio is equal to the first aspect ratio; and aligning the second interchangeable light integrator with the active area when the third aspect ratio is equal to the second aspect ratio.

16. The method of claim 15 wherein the first or the second interchangeable light integrator comprises a light pipe homogenizing rod.

17. The method of claim 15 wherein the first or the second interchangeable light integrator comprises a light integrating sphere.

18. The method of claim 15 wherein the first interchangeable light integrator is included in a first optical assembly and the second interchangeable light integrator is included in a second optical assembly and wherein aligning the first interchangeable light integrator comprises removing the second optical assembly and inserting the first optical assembly.

19. The method of claim 18 wherein removing the second optical assembly and inserting the first optical assembly comprises using an exchange mechanism.

20. The method of claim 15 wherein the first or the second light integrator comprises a solid rod of optical material.

21. The optical system of claim 1 wherein the active area of the imager is vertically oriented.

* * * * *